United States Patent
Naidu

(10) Patent No.: US 8,006,629 B2
(45) Date of Patent: Aug. 30, 2011

(54) PLASTIC PALLET WITH SNAP-PINS AND ASSOCIATED METHOD FOR MAKING THE SAME

(75) Inventor: Vishnu Naidu, Windermere, FL (US)

(73) Assignee: Chep Technology Pty Limited, Sydney (AU)

( * ) Notice: Subject to any disclaimer, the term of this patent is extended or adjusted under 35 U.S.C. 154(b) by 304 days.

(21) Appl. No.: 12/056,663

(22) Filed: Mar. 27, 2008

(65) Prior Publication Data

US 2008/0236455 A1  Oct. 2, 2008

Related U.S. Application Data

(60) Provisional application No. 60/909,094, filed on Mar. 30, 2007.

(51) Int. Cl.
*B65D 19/12* (2006.01)

(52) U.S. Cl. ............................ 108/56.3; 108/57.25

(58) Field of Classification Search ............. 108/57.25, 108/56.1, 56.3, 51.11, 901, 902; 403/252, 403/109.1, DIG. 14, 238–240
See application file for complete search history.

(56) References Cited

U.S. PATENT DOCUMENTS

| | | | | |
|---|---|---|---|---|
| 3,628,816 A * | 12/1971 | Ross, Jr. | | 403/2 |
| 3,832,955 A * | 9/1974 | Pottinger et al. | | 108/57.27 |
| 4,062,300 A | 12/1977 | Real | | 108/53.5 |
| 4,145,976 A * | 3/1979 | Svirklys | | 108/56.1 |
| 4,735,154 A * | 4/1988 | Hemery | | 108/56.1 |
| 4,843,976 A | 7/1989 | Pigott et al. | | 108/56.1 |
| 4,898,493 A * | 2/1990 | Blankenburg | | 403/326 |
| 4,965,915 A * | 10/1990 | Steininger | | 24/607 |
| 5,413,052 A * | 5/1995 | Breezer et al. | | 108/56.1 |
| 5,483,899 A * | 1/1996 | Christie | | 108/56.3 |
| 5,791,261 A | 8/1998 | John et al. | | 108/56.3 |
| 5,887,529 A * | 3/1999 | John et al. | | 108/56.1 |
| 6,021,721 A | 2/2000 | Rushton | | 108/56.3 |
| 6,029,583 A * | 2/2000 | LeTrudet | | 108/57.25 |
| 6,322,282 B1 * | 11/2001 | Kussman et al. | | 403/329 |
| 6,622,642 B2 * | 9/2003 | Ohanesian | | 108/57.25 |
| 6,955,129 B2 * | 10/2005 | Moore et al. | | 108/57.25 |
| 2005/0129901 A1 * | 6/2005 | Swindler et al. | | 428/76 |

FOREIGN PATENT DOCUMENTS

EP  400640  * 12/1990

* cited by examiner

*Primary Examiner* — Jose V Chen
*Assistant Examiner* — Matthew Ing
(74) *Attorney, Agent, or Firm* — Allen, Dyer, Doppelt, Milbrath & Gilchrist, P.A.

(57) ABSTRACT

A pallet includes an upper and lower deck. The upper deck includes snap-pin openings. First joining members project downwardly from the upper deck, with each first joining member including an outer sleeve surrounding a respective snap-pin opening. Second joining members project upwardly from the lower deck, with each second joining member including an inner sleeve and a snap-pin receiving cavity positioned therein. The inner sleeves receive the outer sleeves to define support blocks joining the upper and lower decks. Snap-pins are inserted into the snap-in openings in the upper deck. Each snap-pin includes a head for engaging a snap-pin opening, and spaced apart tips that extend through the snap-pin receiving cavity for engaging a backside of the inner sleeve associated therewith.

27 Claims, 4 Drawing Sheets

PLASTIC PALLET WITH SNAP-PINS AND ASSOCIATED METHOD FOR MAKING THE SAME

RELATED APPLICATION

This application claims the benefit of U.S. Provisional Application 60/909,094 filed Mar. 30, 2007, the entire contents of which are incorporated herein by reference.

FIELD OF THE INVENTION

The present invention relates to the field of pallets useful in material handling, and more particularly, to a multi-piece plastic pallet designed for use with forklift equipment.

BACKGROUND OF THE INVENTION

Pallets are customarily used to transport and store goods. A pallet typically includes an upper deck and a lower deck separated by support blocks. Pallets have traditionally been formed of wood. While advantageous in terms of cost, wood pallets have many disadvantages. For example, they are subject to breakage and are therefore reusable only over a short period of time. Wooden pallets are also difficult to maintain in a sanitary condition, thereby limiting their usability in applications where sanitation is important, such as in food handling applications.

With the growth of the plastics industry a wide variety of plastics have been investigated to determine their suitability for use in producing pallets. Plastic pallets can easily be molded and are stronger and lighter weight than wooden pallets. They can also be made with recyclable materials. Furthermore, plastic pallets are more durable than wooden pallets.

In terms of durability, plastic pallets come into repeated contact with the sharp metal tines of a forklift, which is also referred to as a pallet jack. The support blocks separating the upper and lower decks are subjected to the most intense wear of any part on the pallet. In addition, if the tines of a pallet jack are inserted too far between the upper and lower decks such that the wheels of the pallet jack are resting on the lower deck, then the upper deck becomes separated from the lower deck when the tines of the pallet jack are lifted. The resulting damage from the upper deck being separated from the lower deck requires the upper deck to be replaced, and if the damage is too extensive, then the entire pallet is replaced.

If only the support blocks are damaged by the pallet jack, then they may be replaced at a cost far less than replacing the entire pallet. For example, U.S. Pat. No. 5,413,052 discloses a plastic pallet having an upper deck and a lower deck, with replaceable support blocks therebetween. The support blocks include octagonal posts having support member walls positioned beneath reinforced portions of the upper deck. The posts also have a sleeve with a central bolt hole parallel to the support member walls. The lower deck receives the support blocks in recessed pockets. Plastic bolts are inserted through the upper deck, each post, and the lower deck. Plastic T-nuts are used for holding the bolts in place.

In U.S. Pat. No. 4,843,976 a plastic pallet includes identical upper and lower decks interconnected by support blocks. Each support block includes a central core and a surrounding sleeve interconnected by spokes. The core has flexible tabs that extend beyond opposite ends of the sleeve and lock onto the base and cargo layers. The plastic pallet disclosed in U.S. Pat. No. 5,791,261 also discloses the use of flexible tabs for holding the base and cargo layers together. In particular, the plastic pallet comprises support blocks between the upper and lower decks, and upper and lower snap-lock elements extend from the respective upper and lower decks through the support blocks for inter-locking with one another.

While plastic pallets offer several advantages over wood pallets, there is still a demand to increase durability and strength of plastic pallets.

SUMMARY OF THE INVENTION

In view of the foregoing background, an object of the present invention is to reduce or limit damage to plastic pallets caused by a forklift or other lifting devices.

This and other objects, advantages and features in accordance with the present invention are to provide a plastic pallet comprising an upper deck including snap-pin openings, and first joining members that project downwardly from the upper deck, with each first joining member including an outer sleeve surrounding a respective snap-pin opening. The pallet may further comprises a lower deck, and second joining members that project upwardly from the lower deck, with each second joining member including an inner sleeve and a snap-pin receiving cavity positioned therein.

The inner sleeves of the second joining members may receive the outer sleeves of the first joining members to define support blocks joining the upper and lower decks. Each support block may include rounded edges. Snap-pins may be inserted into the snap-pin openings in the upper deck. Each snap-pin may comprise a head for engaging a snap-pin opening and spaced apart tips that extend through the snap-pin receiving cavity for engaging a backside of the inner sleeve associated therewith.

An advantage of the snap-pins is that they act as fusible links in the event an excessive separation force is applied between the upper and lower decks of the pallet. This separation force may result when the wheels of a pallet jack are resting on the lower deck, and the tines extending from the pallet jack are lifted upwards. This causes the upper deck to become separated from the lower deck. At the support blocks, the tabs on the fusible links will snap or break when the separation force becomes too excessive. Consequently, instead of replacing the entire upper deck, the snap-pins with the broken tabs are replaced.

Each snap-pin may further comprise a body coupled between the head and the spaced apart tips. The spaced apart tips may resiliently extend outwards from the body after having passed through the snap-pin receiving cavity for engaging the backside of the inner sleeve associated therewith.

The spaced apart tips of each snap-pin may be angled to facilitate insertion thereof through the snap-pin receiving cavity. The spaced apart tips of each snap-pin may comprise a respective lip for engaging the backside of the inner sleeve. The respective lips of each snap-pin may be configured to break off based on a separation force applied between the upper and lower decks.

Each second joining member may further comprise ribs extending between the inner sleeve and the snap-pin receiving cavity positioned therein. The ribs may radially extend along a length of the inner sleeve and along a length of the snap-pin receiving cavity. Consequently, an advantage of the support blocks is that the impact energy from contact with the tines of the forklift can be dissipated among the following elements: the outer sleeve, the inner sleeve, the radial ribs and the cylindrical core defined by the snap-pin receiving cavity in the inner sleeve. The fork tines strike the outer sleeve first, which absorbs most of the impact energy. The impact energy may then be transmitted to the inner sleeve, which also absorbs some of the impact energy. More absorption of the impact energy takes place at the radial ribs. The remaining impact energy reaches the snap-pin receiving cavity for dissipation.

Another aspect is directed to a method for making a pallet as described above. The method may comprise positioning the inner sleeves of the second joining members for receiving the outer sleeves of the first joining members to define a plurality of support blocks joining the upper and lower decks. Snap-pins may be inserted into the snap-in openings in the upper deck. Each snap-pin may comprise a head for engaging a snap-pin opening, and spaced apart tips that extend through the snap-pin receiving cavity for engaging a backside of the inner sleeve associated therewith.

DETAILED DESCRIPTION OF THE PREFERRED EMBODIMENTS

Figure 1:
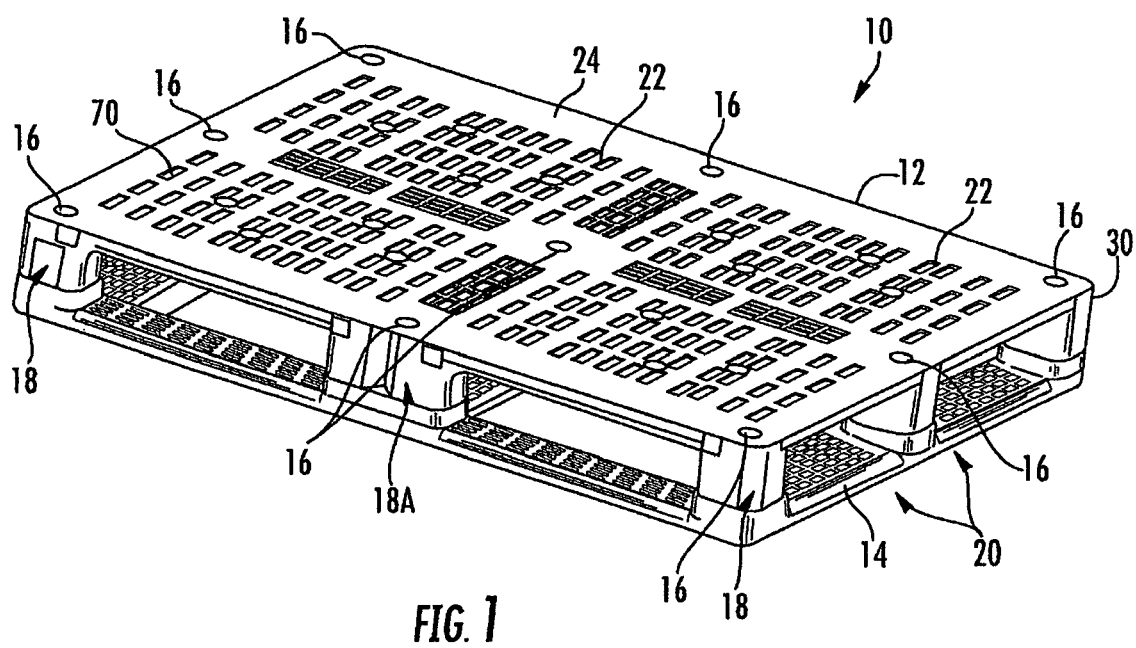
FIG. 1 is a top perspective view of an assembled pallet in accordance with the present invention.
Figure 2:
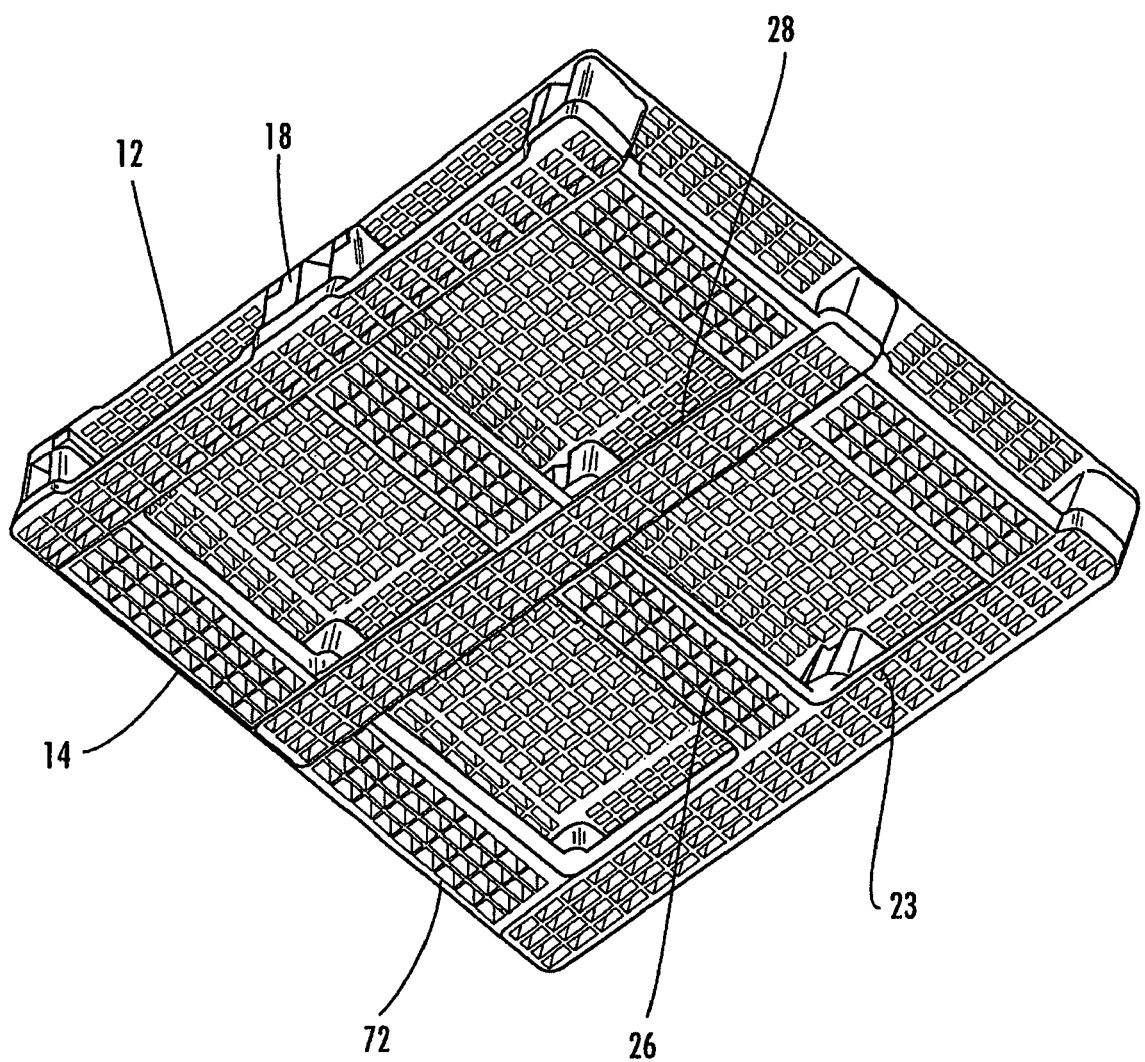
FIG. 2 is a bottom perspective view of the pallet shown in FIG. 1.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

FIGS. 1-4 illustrate top and bottom perspective views of a pallet 10 having upper and lower decks 12, 14 that are held together using snap-pins 16. The upper deck 12 is also known as the cargo layer, and the lower deck 14 is also known as the base layer.

The upper deck 12 includes a plurality of first joining members that project downwardly from the upper deck, with each first joining member including an outer sleeve 40. The lower deck 14 includes a plurality of second joining members that project upwardly from the lower deck, with each second joining member including an inner sleeve 42. The inner sleeves 42 of the second joining members receive the outer sleeves 40 of the first joining members to define support blocks 18, 18a joining the upper and lower decks 12, 14.

The support blocks 18, 18a define a space 20 between the upper and lower decks 12, 14 for receiving at least one lifting member, such as a tine of a pallet jack. An advantage of the snap-pins 16 is that they act as fusible links in the event a separation force is applied between the upper and lower decks 12, 14 of the pallet 10. This separation force may result when the wheels of the pallet jack are resting on the lower layer 14, and the tines extending from the pallet jack are lifted upwards. This causes the upper deck 12 to become separated from the support blocks 18, 18a. The tabs 50 on the fusible links 16 will snap or break when the separation force becomes too excessive. Consequently, instead of replacing the entire upper deck 12, the snap-pins 16 with the broken tabs 50 are replaced.

As will be discussed in greater detail below, the support blocks 18, 18a are formed by the outer and inner sleeves 40, 42 extending from the respective upper and lower decks 12, 14. The outer and inner sleeves 40, 42 are molded as part of their respective upper and lower decks 12, 14. However, the upper and lower decks 12, 14 are separately molded.

The upper deck 12 includes a generally flat, planar surface having a plurality of holes 22 extending therethrough. Likewise, the lower deck 14 includes a generally flat, planar surface having a plurality of holes 23 extending therethrough. The holes 22, 23 provide several benefits including a reduced surface area of the upper and lower decks 12, 14, increased air circulation for items placed on the upper deck, and a reduced weight of the pallet, for example. An example plastic pallet with upper and lower decks is disclosed in U.S. published patent application number 2007/0256609. This patent is assigned to the current assignee of the present invention, and is incorporated herein by reference in its entirety.

The upper deck 12 may include an outer perimeter 24 of the planar surface that does not include any holes 12. This area may be about 3 to 5 inches wide, for example. The lower deck 14 has a perimeter shape that substantially matches the perimeter shape of the upper deck 12. The lower deck 14 may include a rectangular perimeter shape having cross members 26, 28 that intersect a center portion of each side of the rectangular perimeter, midway between the corners of the pallet 10.

The upper and lower decks 12, 14 may be molded from thermoplastic or other polymer materials, including high density polyethylene (HDPE), polypropylene (PP), among other polymer materials. As may be appreciated by those skilled in the art, the polymer materials may be filled or unfilled and/or may include particulate or fibrous, natural or synthetic materials, among other features. For example, unfilled HDPE may provide improved impact strength, PP having strengtheners (i.e., long glass fibers) may provide improved structural properties, and unfilled PP with random copolymers may provide improved reinforcement qualities.

The upper and lower decks 12, 14 may be molded from different thermoplastics or polymer materials. For example, the upper deck 12 may be molded from a first type of thermoplastic or polymer material, while the lower deck 12 may be molded from a second type of thermoplastic or polymer material. According to alternative embodiments, all or a portion of the upper and lower decks 12, 14 may be constructed from materials other than plastic, such as wood and/or metal, for example.

The illustrated pallet 10 is substantially square-shaped. An example size of the pallet 10 is 48 inches by 48 inches, for example. As readily appreciated by those skilled in the art, the pallet 10 may also be formed with other rectangular shapes, such as 40 inches by 48 inches, for example. The pallet 10 may include rounded corners/edges 30 along the perimeter thereof. Rounded corners/edges 30 help to reduce and/or deflect damage during impact with the tines of a forklift, as well as providing an improved aesthetic appearance.

The illustrated pallet 10 includes a plurality of support blocks 18, 18a that are provided to join the upper and lower decks 12, 14 together as well as providing separation so that the tines of a pallet jack can be inserted therebetween. For example, the illustrated pallet 10 includes nine support blocks 18, 18a that are located at the corners of the pallet, as well as between the corners of the pallet along the outer edges of the pallet. A support block 18a is also provided in a center of the pallet 10 at the intersection of cross members 26, 28 in the lower deck 14.

Each support block 18, 18a is defined by an outer sleeve 40 projecting downwardly from the upper deck 12 and an inner sleeve 42 projecting upwardly from the lower deck 14. The outer and inner sleeves 40, 42 are molded with their respective upper and lower decks 12, 14. The outer and inner sleeves 40, 42 are sized so that they overlap one another when joined together. The shapes of the outer and inner sleeves 40, 42 are not limited to any particular shape. The outer and inner sleeves 40, 42 may be square-shaped, triangular-shaped, oval-shaped or cross-shaped, for example. The edges of the outer sleeves 40 may be rounded.

The upper deck 12 includes a plurality of snap-pin openings for receiving the snap-pins 16. Each outer sleeve 40 surrounds a respective snap-pin opening. The lower deck 14 includes a snap-pin receiving cavity 44 positioned within each inner sleeve 42. A plurality of radial ribs 43 extending between the snap-pin receiving cavity 44 and the inner sleeve 42.

An advantage of the support blocks 18, 18a is that the impact energy from contact with the tines of the forklift can be dissipated among the following elements: the outer sleeve 40, the inner sleeve 42, the radial ribs 43 and the cylindrical core defined by the snap-pin receiving cavity 44 in the inner sleeve. The fork tines strike the outer sleeve 40 first, which absorbs most of the impact energy. The impact energy may then be transmitted to the inner sleeve 42, which also absorbs some of the impact energy. More absorption of the impact energy takes place at the radial ribs 43. The remaining impact energy reaches the snap-pin receiving cavity 44 for dissipation.

Figure 5:
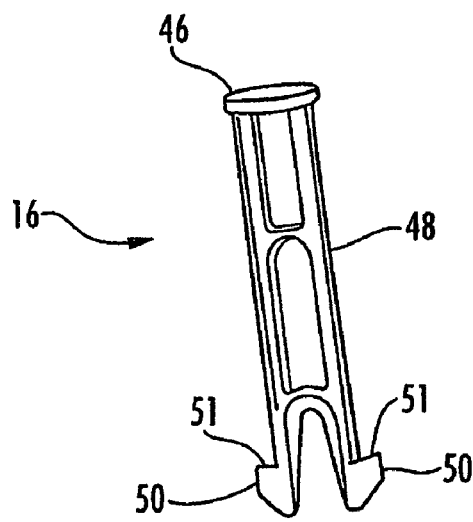
FIG. 5 is a perspective view of a snap-pin used within each support block in accordance with the present invention.
Figure 6:
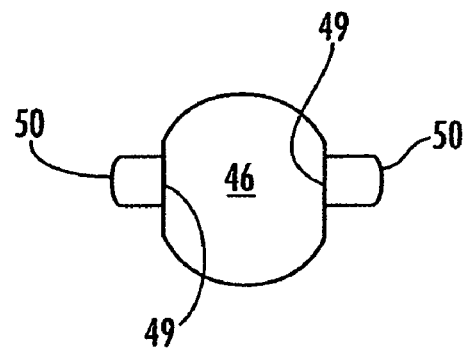
FIG. 6 is a top view of the snap-pin shown in FIG. 5.

Each snap-pin 16 includes a head 46, a body 48 and spaced apart tips 50, as best illustrated in FIG. 5. The head 46 is for engaging a snap-pin opening in the upper deck 12. The head 46 of each snap-pin 16 may be shaped to include spaced apart straight edges 49, as illustrated in FIG. 6. Each snap-pin opening in the upper deck 12 is correspondingly shaped the same. This helps to hold the snap-pins 16 in place. The snap-pins 16 are typically inserted into the pallet 10 after the upper and lower decks 12, 14 have been joined together to form the support blocks 18, 18a.

Figure 7:
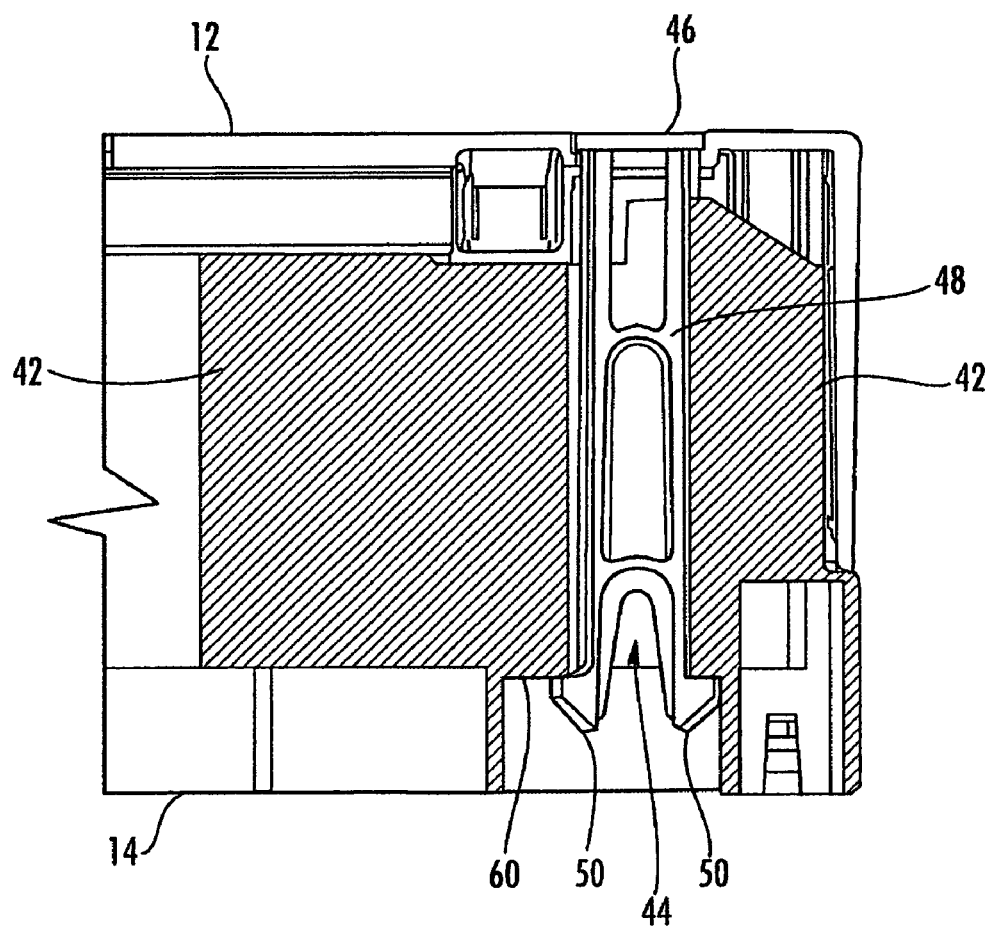
FIG. 7 is a partial cross-sectional side view of a pallet illustrating a snap-pin within a support block in accordance with the present invention.

The spaced apart tips 50 extend through the snap-pin receiving cavity 44 for engaging a backside 60 of the inner sleeve, as best illustrated in FIG. 7. The snap-pin receiving cavity 44 does not extend all the way from the top of the inner sleeve 42 to the bottom of the lower deck 14. This is to allow room for the tabs 50 on the snap-pin 16 to clear and engage the backside 60 of the inner sleeve 42.

Figure 3:
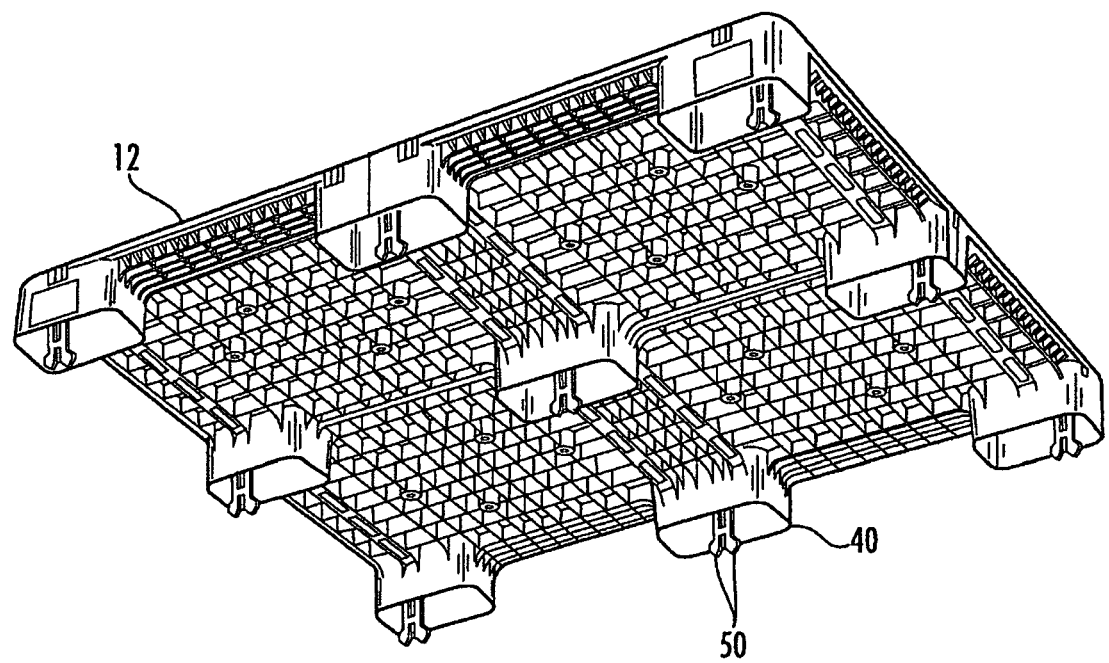
FIG. 3 is a bottom perspective view of the upper deck of the pallet shown in FIG. 1.
Figure 4:
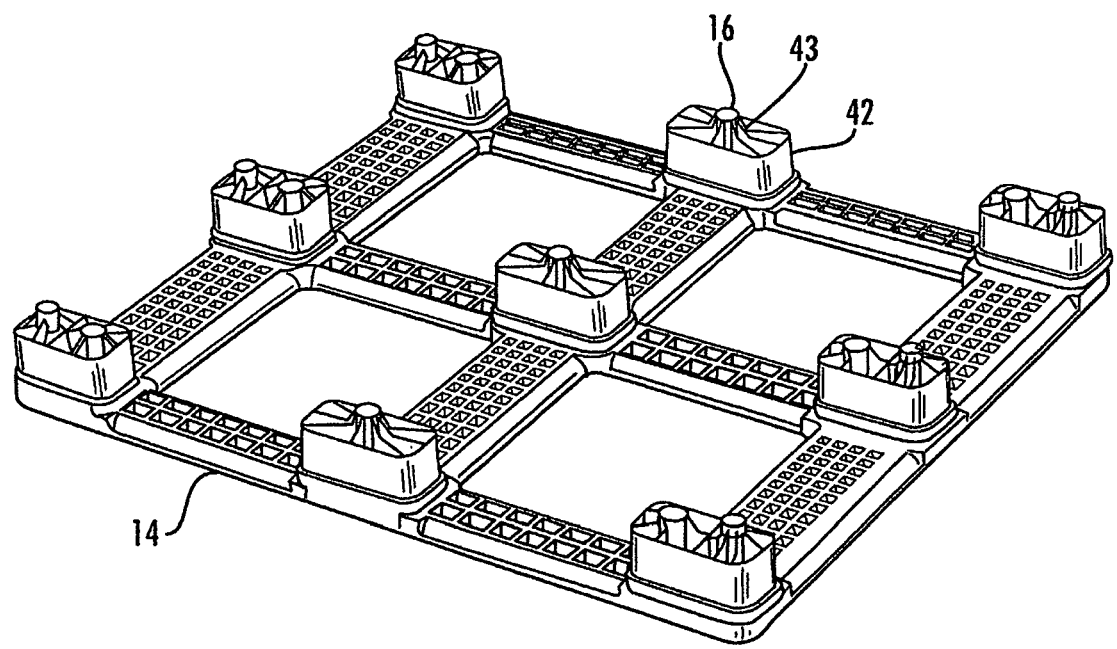
FIG. 4 is a top perspective view of the lower deck of the pallet shown in FIG. 1.

Even though the upper and lower decks 12, 14 are separated in FIGS. 3 and 4, the snap-pins 16 are positioned accordingly for illustration purposes. As illustrated in FIG. 3, the snap-pins 16 extend within and past the outer sleeves 40. As illustrated in FIG. 4, the heads 46 of the snap-pins 16 are raised above the inner sleeve 42 and the snap-pin receiving cavities 44 without the lower deck 14 in place. This allows clearance for the head 46 of each snap-pin 16 to engage a snap-pin opening in the upper deck 12, while the spaced apart tips 50 extend through the snap-pin receiving cavity 44 for engaging a backside 60 of the inner sleeve 42 associated therewith.

The spaced apart tips 50 of each snap-pin 16 resiliently extend outwards from the body 48 after having passed through the snap-pin receiving cavity 44 for engaging the backside 60 of the inner sleeve 42 associated therewith. The spaced apart tips 50 of each snap-pin 16 may be angled to facilitate insertion thereof through the snap-pin receiving cavity 44. The spaced apart tips 50 of each snap-pin comprise a respective lip 51 for engaging the backside of the inner sleeve. The respective lips 51 are configured to break off based on an excessive separation force applied between the upper and lower decks 12, 14. The snap-pins 16 are also formed out of plastic. Alternatively, the snap-pins 16 may be formed out any of the materials used to form the upper and lower decks 12, 14 as discussed in detail above.

Another aspect is directed to a method for making a pallet 10 as described above. The method comprises positioning the inner sleeves 42 of the plurality of second joining members for receiving the outer sleeves 40 of the plurality of first joining members to define a plurality of support blocks 18, 18a joining the upper and lower decks 12, 14. A plurality of snap-pins 16 is inserted into the plurality of snap-in openings in the upper deck 12. Each snap-pin 16 comprises a head 46 for engaging a snap-pin opening 44 and spaced apart tips 50 that extend through the snap-pin receiving cavity 44 for engaging a backside 60 of the inner sleeve 42 associated therewith.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included as readily appreciated by those skilled in the art.

That which is claimed:

1. A pallet comprising:
    an upper deck including a plurality of snap-pin openings;
    a plurality of first joining members that project downwardly from said upper deck, each first joining member integrally molded with said upper deck and including an outer sleeve surrounding a respective snap-pin opening;
    a lower deck;
    a plurality of second joining members that project upwardly from said lower deck, each second joining member integrally molded with said lower deck and including an inner sleeve and a snap-pin receiving cavity positioned therein;
    the inner sleeves of said plurality of second joining members receiving the outer sleeves of said plurality of first joining members to define a plurality of support blocks joining said upper and lower decks; and
    a plurality of snap-pins inserted into the plurality of snap-pin openings in said upper deck, each snap-pin comprising
        an integrally formed closed headend for engaging a snap-pin opening,
        a body coupled to said integrally formed closed headend and extending within the snap-pin receiving cavity, and comprising a pair of spaced apart sides and at least one lateral strut extending therebetween, and
        a pair of spaced apart tips coupled to said at least one lateral strut and extending through the snap-pin receiving cavity for resiliently engaging a backside of the inner sleeve associated therewith, said pair of spaced apart tips extending beyond a width of said integrally formed closed headend to function as a fusable link by breaking off when an excessive separation force is applied between said upper and lower decks.

2. The pallet according to claim 1, wherein the spaced apart tips of each snap-pin are angled to facilitate insertion thereof through the snap-pin receiving cavity.

3. The pallet according to claim 1, wherein the spaced apart tips of each snap-pin comprise a respective lip for engaging the backside of the inner sleeve.

4. The pallet according to claim 3, wherein the respective lips of each snap-pin are configured to break off based on the excessive separation force applied between said upper and lower decks.

5. The pallet according to claim 1, wherein the headend of each snap-pin is shaped to include spaced apart straight edges; and wherein each snap-pin opening in said upper deck is shaped the same.

6. The pallet according to claim 1, wherein each second joining member further comprises ribs extending between the inner sleeve and the snap-pin receiving cavity positioned therein.

7. The pallet according to claim 6, wherein the ribs radially extend along a length of the inner sleeve and along a length of the snap-pin receiving cavity.

8. The pallet according to claim 1, wherein said plurality of first joining members and said plurality of second joining members are positioned at matching locations on said corresponding upper and lower decks; and
wherein the matching locations include corners of said corresponding upper and lower decks, a perimeter between the corners of said corresponding upper and lower decks, and a center of said corresponding upper and lower decks.

9. The pallet according to claim 8, wherein said upper deck includes nine of said first joining members; and wherein said lower deck includes nine of said second joining members.

10. The pallet according to claim 1, wherein each support block includes rounded edges.

11. The pallet according to claim 1, wherein said upper and lower decks, said plurality of first and second joining members, and said plurality of snap-pins comprise plastic.

12. A pallet comprising:
an upper deck including a plurality of snap-pin openings;
a plurality of first joining members that project downwardly from said upper deck, each first joining member including an outer sleeve surrounding a respective snap-pin opening;
a lower deck;
a plurality of second joining members that project upwardly from said lower deck, each second joining member including an inner sleeve, a snap-pin receiving cavity positioned therein, and a plurality of ribs extending between the inner sleeve and the snap-pin receiving cavity;
the inner sleeves of said plurality of second joining members receiving the outer sleeves of said plurality of first joining members to define a plurality of support blocks joining said upper and lower decks; and
a plurality of snap-pins inserted into the plurality of snap-pin openings in said upper deck, each snap-pin comprising
an integrally formed closed headend for engaging a snap-pin opening,
a body coupled to said integrally formed closed headend and extending within the snap-pin receiving cavity, and comprising a pair of spaced apart sides and at least one lateral strut extending therebetween, and
a pair of spaced apart tips coupled to said at least one lateral strut and extending through the snap-pin receiving cavity for resiliently engaging a backside of the inner sleeve associated therewith, said pair of spaced apart tips extending beyond a width of said integrally formed closed headend to function as a fusable link by breaking off when an excessive separation force is applied between said upper and lower decks.

13. The pallet according to claim 12, wherein the spaced apart tips of each snap-pin are angled to facilitate insertion thereof through the snap-pin receiving cavity.

14. The pallet according to claim 12, wherein the spaced apart tips of each snap-pin comprise a respective lip for engaging the backside of the inner sleeve.

15. The pallet according to claim 14, wherein the respective lips of each snap-pin are configured to break off based on the excessive a separation force applied between said upper and lower decks.

16. The pallet according to claim 12, wherein the ribs radially extend along a length of the inner sleeve and along a length of the snap-pin receiving cavity.

17. The pallet according to claim 12, wherein said plurality of first joining members and said plurality of second joining members are positioned at matching locations on said corresponding upper and lower decks; and
wherein the matching locations include corners of said corresponding upper and lower decks, a perimeter between the corners of said corresponding upper and lower decks, and a center of said corresponding upper and lower decks.

18. The pallet according to claim 12, wherein said upper and lower decks, said plurality of first and second joining members, and said plurality of snap-pins comprise plastic.

19. A method for making a pallet comprising upper and lower decks, the upper deck including a plurality of snap-pin openings, a plurality of first joining members that project downwardly from the upper deck, with each first joining member including an outer sleeve surrounding a respective snap-pin opening, and a plurality of second joining members that project upwardly from the lower deck, with each second joining member including an inner sleeve and a snap-pin receiving cavity positioned therein, the method comprising:
positioning the inner sleeves of the plurality of second joining members for receiving the outer sleeves of the plurality of first joining members to define a plurality of support blocks joining the upper and lower decks; and
inserting a plurality of snap-pins into the plurality of snap-pin openings in the upper deck, each snap-pin comprising
an integrally formed closed headend for engaging a snap-pin opening,
a body coupled to the integrally formed closed headend and extending within the snap-pin receiving cavity, and comprising a pair of spaced apart sides and at least one lateral strut extending therebetween, and
a pair of spaced apart tips coupled to the at least one lateral strut and extending through the snap-pin receiving cavity for resiliently engaging a backside of the inner sleeve associated therewith, the pair of spaced apart tips extending beyond a width of the integrally formed closed headend to function as a fusable link by breaking off when an excessive separation force is applied between the upper and lower decks.

20. The method according to claim 19, wherein the spaced apart tips of each snap-pin are angled to facilitate insertion thereof through the snap-pin receiving cavity.

21. The method according to claim 19, wherein the spaced apart tips of each snap-pin comprise a respective lip for engaging the backside of the inner sleeve.

22. The method according to claim 21, wherein the respective lips of each snap-pin are configured to break off based on the excessive separation force applied between the upper and lower decks.

23. The method according to claim 19, wherein the head-end of each snap-pin is shaped to include spaced apart straight edges; and wherein each snap-pin opening in the upper deck is shaped the same.

24. The method according to claim 19, wherein each second joining member further comprises ribs extending between the inner sleeve and the snap-pin receiving cavity positioned therein.

25. The method according to claim 24, wherein the ribs radially extend along a length of the inner sleeve and along a length of the snap-pin receiving cavity.

26. The method according to claim 19, wherein the plurality of first joining members and the plurality of second joining members are positioned at matching locations on the corresponding upper and lower decks; and wherein the matching locations include corners of the corresponding upper and lower decks, a perimeter between the corners of the corresponding upper and lower decks, and a center of the corresponding upper and lower decks.

27. The method according to claim 19, wherein the upper and lower decks, the plurality of first and second joining members, and the plurality of snap-pins comprise plastic.

\* \* \* \* \*